(12) United States Patent
Toennessen

(10) Patent No.: US 7,738,317 B2
(45) Date of Patent: Jun. 15, 2010

(54) APPARATUS AND METHODS FOR CONTROLLING POSITION OF MARINE SEISMIC SOURCES

(75) Inventor: Rune Toennessen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 12/194,926

(22) Filed: Aug. 20, 2008

(65) Prior Publication Data
US 2008/0304357 A1    Dec. 11, 2008

Related U.S. Application Data

(63) Continuation of application No. 11/055,169, filed on Feb. 10, 2005, now abandoned.

(51) Int. Cl.
*G01V 1/38* (2006.01)
(52) U.S. Cl. .......................... 367/16; 367/15; 114/242; 114/246
(58) Field of Classification Search .................. 367/15, 367/16, 17, 19; 114/242, 246
See application file for complete search history.

(56) References Cited

U.S. PATENT DOCUMENTS

| | | | | |
|---|---|---|---|---|
| 4,748,599 A | * | 5/1988 | Gjestrum et al. | 367/17 |
| 4,890,568 A | * | 1/1990 | Dolengowski | 114/246 |
| 6,234,102 B1 | * | 5/2001 | Russell et al. | 367/15 |
| 6,504,792 B2 | * | 1/2003 | Barker | 367/17 |
| 7,379,391 B2 | * | 5/2008 | Soerli et al. | 367/144 |

* cited by examiner

*Primary Examiner*—Scott A Hughes

(57) ABSTRACT

Apparatus and methods are described for remotely controlling position of marine seismic equipment. One apparatus comprises a source connected to a tow member; and an adjustment mechanism connected to the source and the tow member, the adjustment mechanism adapted to actively manipulate an angle of attack of the source. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

20 Claims, 10 Drawing Sheets

APPARATUS AND METHODS FOR CONTROLLING POSITION OF MARINE SEISMIC SOURCES

This is a continuation of U.S. application Ser. No. 11/055,169, entitled "Apparatus and Methods for Controlling Position of Marine Seismic Sources", filed Feb. 10, 2005 now abandoned, in the name of the inventor Rune Toennessen ("the '169 application"). The earlier effective filing date of the '169 application is hereby claimed for all common subject matter. The '169 application is also hereby incorporated by reference in its entirety for all purposes as if expressly set forth verbatim herein.

BACKGROUND OF THE INVENTION

1. Field of Invention

The present invention relates to the field of marine seismic instruments and methods of controlling same. More specifically, the invention relates to apparatus and methods for remotely controlling position marine seismic instrumentation, as well as related systems, methods, and devices.

2. Related Art

Marine seismic exploration investigates and maps the structure and character of subsurface geological formations underlying a body of water. For large survey areas, a single vessel may tow one or more seismic sources and one or more seismic streamer cables through the water. Alternatively, a tow vessel may either be a "pure" source vessel (meaning it only tows seismic sources) or a "pure" streamer (receiver) vessel, in which case two or more vessels may be used. In any case the seismic sources may comprise compressed air guns or other means for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Three-dimensional (3-D) seismic surveys of a grid provide more information regarding the subsurface formations than two-dimensional seismic surveys. 3-D surveys may be conducted with up to twelve or more streamers that form an array covering a large area behind the vessel. The streamers typically vary in length between three and twelve kilometers. Tail buoys attached at the streamer distal ends carry radar reflectors, navigation equipment, and acoustic transponders. Hydrophones are positioned along each streamer. The in-line interval between each receiver, or receiver group, ranges between about 3 and 25 meters, with 12.5 meters comprising typical interval spacing.

Since the grid is often much wider than the array, the tow vessel must turn around and tow the array in laps across the grid, being careful not to overlap or leave large gaps between the laps across the grid.

A multiple streamer array requires deflectors near the vessel to pull the streamers outwardly from the direct path behind the seismic tow vessel and to maintain the transverse or crossline spacing between individual streamers. The same is true for multiple sources being towed behind a tow vessel when no streamers are present. Deflectors rely on hydrodynamic lift created by forward motion through the water to pull the streamers and/or sources outwardly and to maintain the transverse position relative to the vessel path.

In 4-D geophysical imaging, a 3-D seismic survey is repeated over a grid that has been previously surveyed. This series of surveys taken at different times may show changes to the geophysical image over time caused, for example, by extraction of oil and gas from a deposit.

It is important that the source members being used to generate the acoustical pulses be located as closely as possible to the same location as in previous surveys over the same grid. This has been difficult to accomplish in a marine survey because the acoustical source members are typically towed behind the tow vessel in source arrays, which are subject to wave and current movement.

In addition to the deployment and operation difficulties associated with towing multiple streamers and/or multiple source arrays, conventional techniques limit the ability to position source arrays and streamers in different relative positions and orientations. Source array design is limited by the tow configuration. Each towed source array is also subject to crosscurrents, wind, waves, shallow water, and navigation obstacles that limit the coverage provided by the survey system.

Attempts to control the location of seismic sources and source arrays have included attaching distance ropes running to lateral passive deflectors and tow cables; use of active (steerable) deflecting members attached to the source tow cables in front of the source arrays, or mid-way or at the aft end of the source arrays; and use of passive lateral deflectors equipped with a winch located near the front of the source. WO2004092771 A2, published Oct. 28, 2004, (the '771 application) discloses the latter two options. By attaching one or more steerable deflecting members to the front, rear, or mid-section of one or more source arrays, or a winch to the front of the source that acts on a passive lateral deflector, the source array locations may be controlled. Another method and device employs a source array comprising a rigid bar mounted under a rigid or semi-rigid float member, with the seismic source members, for example air-guns, hanging below the rigid bar. FIGS. 1A and 1B illustrate plan and side-elevation views, respectively, of this source array 100. Source array 100 comprises a rigid steel or aluminum member 8 rigidly mounted to a rigid or semi-rigid float 10, which floats near surface 12 of the ocean or other water body. Multiple source members 14 are hung by chains or other means 16 from member 8, and source array 100 is towed behind a seismic vessel (not shown) by a strength-taking source umbilical 2 that is attached to a tow bridle having two elements, a front element 4 attached to a front 5 of member 8, while a second bridle element 6 is attached proximate a mid-section 7 of member 8. The lengths of bridle elements 4 and 6 determines the orientation, or so-called angle of attack of member 8 and float 10 toward the incoming flow, F. Therefore, member 8 and float 10 function as a low aspect ratio hydrofoil creating lateral lift that enables source array 100 to be laterally deflected. However, this method and apparatus offers no possibilities for remotely adjusting the angle of attack.

The previous attempts have not provided optimal control of the location of the source arrays under towing conditions. While these techniques are improvements in the art, further improvement is desired.

SUMMARY OF THE INVENTION

In accordance with the present invention, apparatus, systems and methods are described for actively controlling position of marine seismic sources and source arrays that reduce or overcome problems with previous apparatus and methods. Apparatus and systems of the invention comprise a source array, sometimes referred to herein as a gun-array, the source array comprising one or more source members, sometimes referred to herein as air-guns. As used herein the term "source array" is meant to be broader than the term gun-array, which those skilled in the art will recognize as meaning one or more air-guns. The term "source member" is meant to be broader than the term air-gun, and is meant to include all acoustic sources, including, but not limited to, air-guns, oscillating members, vibration members, explosive charges, percussion devices, and the like. Thus, in the same way that a gun-array includes one or more air-guns, a source array comprises one or more source members. The terms gun-array, gun-string and sub-array are also often used interchangeably in the art to call out an assembly of components, including an array of air-guns, one or more floats, chains, hang plates, everything required to position the gun-array and have it functioning. The term source array will be used herein for this assembly. Finally, the terms "source", "seismic source", and "marine seismic source" are used interchangeably herein, unless a specific embodiment requires a different meaning, and means one or more source arrays comprising some or all source members (e.g., air-guns) fired at the same time. A source may comprise from one to ten source arrays, more typically one to four source arrays. In this regard, the art distinguishes between dual source and single source. Dual source systems comprise two sources, each of say three source arrays, where each source is located offset to the centerline. A single source may comprise three source arrays where the center of the source is located at the centerline.

A first aspect of the invention is an active, position controllable marine seismic apparatus comprising:

a source array connected to a source tow member; and an adjustment mechanism connected to the source array and source tow member, the adjustment mechanism adapted to actively manipulate an angle of attack of the source array. As used herein, "actively manipulate" means controlling the angle of attack either directly or indirectly in response to, and/or in anticipation of, an undesirable change in movement of the source array. "Controlling" may be performed locally on the source array, or remotely through any type of communication system. "Angle of attack" means, when referring to a seismic source array, the angle that the body of the source array makes relative to the direction of flow of water past it, sometimes referred to as the flow vector. This may also be described as the angle that the body of the source array makes relative to its direction of travel through the water. The flow vector may or may not be parallel to the tow member.

The adjustment mechanism may be connected to the source array at one or a plurality of tow points located on the source array, and may include a towing harness. The tow point may be located at a front end of the source array, or at a position between the front end of the source array and a rear end of the source array. The adjustment mechanism may comprise a deflecting member positioned between the float and one or more of the source members, and may further comprise a rigid moment-transfer member having first and second portions, which may or may not be ends, the first portion connected to the source tow member, the second portion connected to a tow point on the deflecting member through a swivel joint, where the swivel joint may be a hinged joint, ball joint, or equivalent function joint. The adjustment mechanism may further comprise an actuator mounted on the deflecting member near the tow point and adapted to actuate the rigid moment-transfer member. The rigid moment-transfer member may be a solid member or hollow, and the solid and hollow members may be cylindrical members, parallelepiped members, or equivalent functional members. The rigid moment-transfer member may also be a telescoping member, an I-beam, or other equivalent functional configuration.

The adjustment mechanism may comprise either a low or high aspect ratio deflecting member positioned between, or in front of a float and one or more source members. In this arrangement, the adjustment mechanism may include a bridle system, and a rotatable connector may be operatively connected to the deflecting member and adapted to function with the bridle system. The rotatable connector may be positioned on the deflecting member approximately at a mid-section of the deflecting member. A local controller may be mounted on the apparatus, the local controller adapted to receive a signal from an on-board controller on a tow vessel or other remote controller and send a signal to the local controller, which then operates an actuator and rotatable connector. The bridle system may comprise a front bridle leg attached to a front end of the deflecting member, and an aft bridle leg comprising a loop that passes through the rotatable connector, and thus the bridle system may be remotely controllable. The bridle system may include a frame that is connected to a front end of the deflecting member via a swivel joint and adapted to pivot about the swivel joint, and the frame may attach to an aft bridle leg comprising a loop that passes through the rotatable connector. The frame may be a triangular frame, or any other shaped frame that performs the equivalent function of moving the bridle legs when actuated. Another alternative is to replace all or substantial portions of the bridle legs with linear actuators. In this latter embodiment, the adjustment mechanism may be a combination of a frame, linear actuators, and a high aspect ratio deflecting member, as further explained herein.

The source array may comprise a float and one or more source members attached to the float.

Apparatus of the invention may further comprise a local controller mounted on the source array, the local controller adapted to receive a signal comprising a desired angle of attack from a remote controller, inform the adjustment mechanism of the desired angle of attack, and signal an actuator to move the adjustment mechanism accordingly. The adjustment mechanism may further comprise a sensor able to measure the actual, or "real" angle of attack of the source array and report this data to the remote controller. Alternatively, rather than sensing and using the real angle of attack of the source array, which may be difficult to measure, the orientation of a component of the source array may be sensed, for example the orientation of the source tow member, the position of an actuator, or the like, and this data used to control the adjustment mechanism.

The term "deflecting member" is to be distinguished from the term "deflector." As used herein a "deflecting member" is a member that is a component of and deflects a source. Deflecting members useful in the invention may comprise a low aspect ratio member or a high aspect ratio member. The deflecting member may be suspended between the float and one or more of the source guns, or the deflecting member may be rigidly attached to the float. In any case, the deflecting member may be positioned between the float and some or all of the source members, in front of the source array, or at the aft end of a source array. The term "deflector" means a discrete device or apparatus connected to the source via an active or passive tow cable. Systems of the invention may include deflecting members but not deflectors, deflectors but not deflecting members, or both deflecting members and deflectors.

Another aspect of the invention are systems comprising a tow vessel, a seismic source connected to the tow vessel by a source tow member, and a remotely controllable deflector. Systems of the invention may comprise many alternative arrangements for connecting the tow vessel, source, and deflector, and all are considered within the scope of the invention. As used herein the terms "active" and "passive" refer to the ability and non-ability to communicate, respectively, of a connection between a tow vessel and a source, between a tow vessel and a deflector (with or with out streamers), and between a source and a deflector (with and without streamers). "Tow member", as used herein, may be an active or passive connection device, and may be a strength-taking component or non-strength-taking component. A strength-taking component is one that is intended to pull, or help pull any of a source array, a deflector, and/or a streamer. The term "umbilical" when used without qualification means an active, power and/or data transmitting tow member that is substantially non-strength-taking; in other words an umbilical can withstand some tension, but is not meant to pull a source array or deflector, unless it is a strength-taking umbilical. Any combination of remotely controllable deflector being connected to and towed by the tow vessel, or towed by the source with and without connection to the tow vessel, and any practical combination of passive tow member with an umbilical, using both wherein at least one is a strength-talking tow member, or using only a strength-taking umbilical if desired, are intended to be within the invention. For example, the following non-limiting embodiments are considered within the invention, wherein the deflector is remotely controllable (wire or wireless) in each:

deflector connected to and towed by the tow vessel with a passive strength-taking tow member, and either 1) a strength-taking umbilical connecting the deflector to the source, or 2) a combination of a passive, strength-taking tow member and an umbilical;

deflector connected to and towed by the tow vessel with a strength-taking umbilical, and a passive tow member extending from the deflector to the source;

deflector connected to and towed by the source by a strength-taking umbilical, with no direct connection to the tow vessel;

deflector connected to and towed by the source by a combination of a strength-taking passive tow member and an umbilical; and deflector connected to and towed by the source by a passive, strength-taking tow member, with an umbilical connecting the deflector to the tow vessel.

Notice that embodiments wherein the remotely controllable deflector is not directly mechanically connected to the tow vessel are considered within the invention. There may be wireless or other non-mechanical transmission between the deflector and tow vessel in such embodiments, and the mechanical connection between deflector and source could be two fold, either a combination of passive, strength-taking tow member (for example chain, or rope) and an umbilical for transmitting electrical power and/or signals, or a single strength-taking umbilical able to take the loads and to transmit electrical power and/or signals. Data transmission and electrical power could go from vessel to source via umbilical and further to deflector via umbilical.

The remotely controllable deflector may be any type of deflector, including wing and boom arrangements, and door-type deflectors, both of which are known in the art, as long as the deflector is, or is modified to be, remotely controllable. One useable deflector comprises a principal wing-shaped body shaped to produce in use a sideways force which urges the marine seismic source laterally with respect to the direction of movement of the towing vessel, a boom extending rearward from the principal wing-shaped body, and an auxiliary wing-shaped body, smaller than the principal wing-shaped body, secured to an end of the boom remote from the principal wing-shaped body and shaped so as to produce in use a sideways force in generally direction opposite to that produced by the principal wing-shaped body, and comprising a remotely operable means for adjusting an angle between the boom and the principal wing-shaped body to vary the sideways force produced by the principal wing-shaped body. Another deflector useful in the invention is a modified "door" type deflector, comprising a plurality of passive hydrofoils mounted within a frame, and at least one active hydrofoil mounted in the frame aft of the passive hydrofoils, the active hydrofoil adapted to be moved and change an angle of attack of the deflector using an actuator and controller positioned in the frame, and through remote communication between the controller and the tow vessel via an umbilical.

Another aspect of the invention comprises methods of remotely controlling position of marine seismic sources, one method comprising actively controlling an angle of attack of a marine seismic apparatus relative to a reference using an adjustment mechanism connected to the apparatus and a tow member. One method of the invention includes sensing the angle of attack (or sensing a parameter indicative of the angle of attack, such as an actuator position) to obtain an acquired value, comparing the acquired value to a desired value and adjusting the adjustment mechanism accordingly. As with the apparatus of the invention, rather than sensing and using the real angle of attack of the source array, which may be difficult to measure, the orientation of a component of the source array may be sensed, for example the orientation of the source tow member, and this data used to control the adjustment mechanism. In other methods of the invention, where the apparatus is a source array comprising a float and one or more source members generally below the float, the method further comprises providing a deflecting member positioned between, in front, or behind the float and one or more of the seismic signal guns, towing the apparatus with a tow vessel using a tow member, and transferring moment from a rigid moment-transfer member having first and second portions to the deflecting member, the first portion connected to the tow member, the second portion connected to a tow point on the deflecting member through a swivel joint. Further methods of the invention include actuating the rigid moment-transfer member using an actuator mounted on the deflecting member near the tow point; controlling the actuator using a local controller mounted on the apparatus; and sending a signal from the tow vessel to the local controller and sending a signal from the local controller to the actuator. Other methods of the invention include towing the apparatus with a tow vessel using a tow member wherein the tow member comprises a bridle system, and transferring moment from the bridle system to the deflecting member. Further methods of the invention include actuating the bridle system using one or more actuators mounted on the deflecting member near a tow point on the deflecting member. Actuators may be rotatable or linear, for example hydraulic or pneumatic cylinders connecting each bridle member to the deflecting member. Actuators may be actuated using a local controller mounted on the apparatus. A local sensor may sense the position or status of an actuator and feed this information back to the local and/or remote controllers. The local controller may receive a signal from the tow vessel and send a signal to the actuator.

Another method of the invention is used to remotely control position of a marine seismic source, one method comprising towing a source using a first strength-taking umbilical connected to a tow vessel, and remotely controlling an angle of attack of a deflector connected to the source by a second umbilical, and connected to the tow vessel by a passive, strength-taking tow member, the deflector positioned laterally from the source during seismic shooting. Alternatively, a method of remotely controlling position of a marine seismic source comprises towing a marine seismic source array using a strength-taking umbilical connected to a tow vessel, and remotely controlling position of a deflector connected to the tow vessel by a second umbilical, and connected to the marine seismic source array via a passive, strength-taking tow member, the deflector positioned laterally from the source array during seismic shooting. In these methods one may sense the angle of attack to obtain an acquired a value, compare the acquired value to a desired value, and adjust the deflector accordingly, or sense a parameter indicative of the angle of attack, such as an actuator position known by experience or experiments to indicate the relationship between the actuator position and the resulting angle of attack. The deflector may be adjusted by using an actuator mounted on the deflector. The actuator may be actuated using a local controller mounted on the deflector, which can send a signal from the tow vessel to the local controller and send a signal from the local controller to the actuator.

Further advantages and features of the invention will be apparent upon review of the brief description of the drawings, the detailed description of the invention, and the claims which follow.

BRIEF DESCRIPTION OF THE DRAWINGS

The manner in which the objectives of the invention and other desirable characteristics can be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments may be possible.

The present invention relates to various apparatus, systems and methods for controlling position of one or more marine seismic components. The terms "controlling position", "position controllable", "remotely controlling position", "remotely adjustable", and "steering" are generally used interchangeably herein, although it will be recognized by those of skill in the art that "steering" usually refers to following a defined path, while "controlling position", "position controllable", and "remotely controlling position" could mean steering, but also could mean merely maintaining a relative position, for example relative to one or more reference points, such as natural or man-made objects, or merely deflecting an object. As "position controllable" and "controlling position" are somewhat broader terms than "steering", these terms are used herein, except when specific instances demand using more specific words. One aspect of the present invention relates to position controllable apparatus. Other aspects of the present invention, which are further explained below, relate to methods for remotely controlling or adjusting position of marine seismic sources.

Figure 2A:
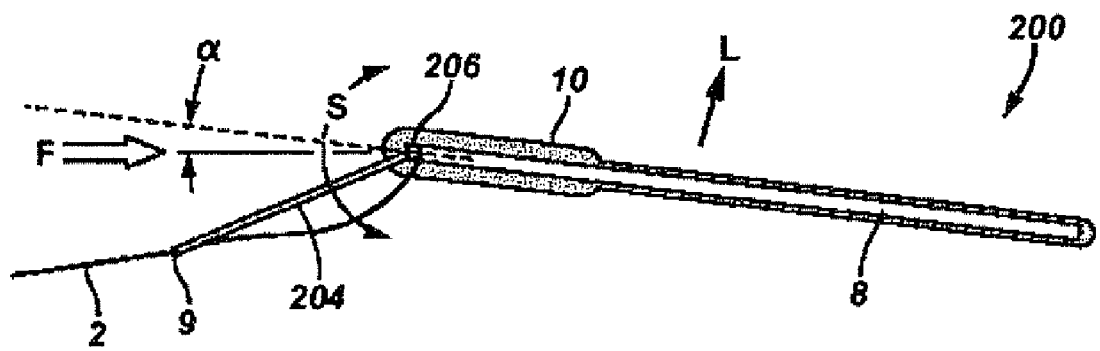
FIGS. 2A and 2B illustrate schematic plan and side-elevation views, respectively, of a first position controllable marine seismic apparatus and method of the invention.
Figure 2B:
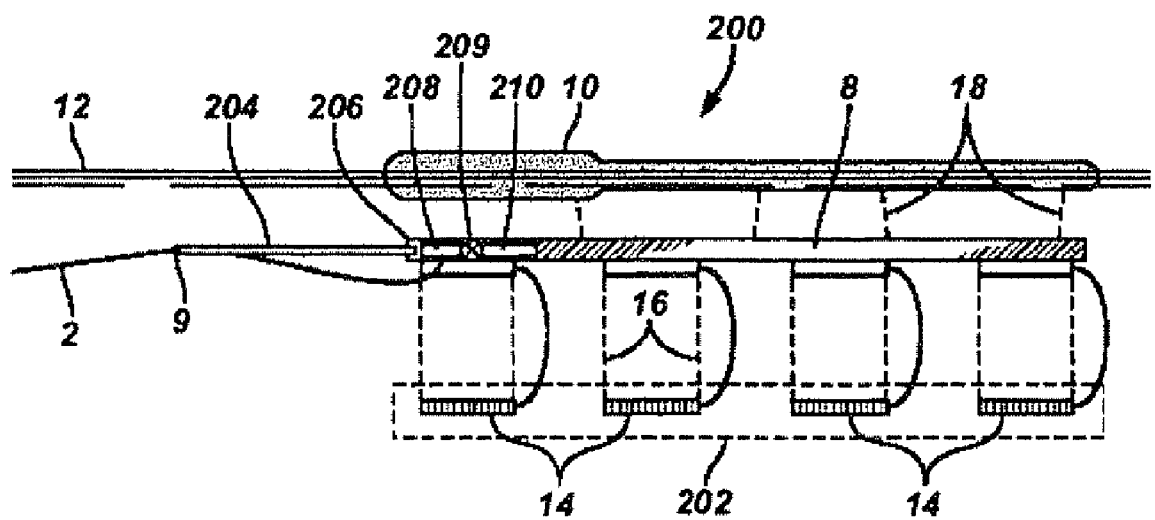

As an example, FIGS. 2A and 2B illustrate plan and side-elevation views, respectively, of a first position controllable marine seismic source array 200 and method of the invention. (The same numerals are used throughout the drawing figures for the same parts unless otherwise indicated.) Source array 200 comprises a plurality 202 of source members 14, for example compressed air guns, which are fired to generate acoustical waves that are reflected from the subsurface geological features back to receivers (not shown) during a seismic exploration. Source members 14 may be other acoustical-wave generation device, such as explosives, percussion devices, and the like. Source array 200 is towed after a seismic vessel (not illustrated) with a strength-taking umbilical 2. Source members 14 may be suspended from chains or other means 16 beneath a plate, beam or similar member 8 that is rigid in at least the lateral plane. Member 8 is in turn suspended from chains or other means 18 beneath a float 10, or alternatively fixed tightly to float 10. Float 10 may be flexible, semi-flexible or rigid. A rigid body 204, illustrated in FIGS. 2A and 2B as a solid cylindrical rod (although other shapes are possible), is fixed to member 8 by a swivel connection 206, which may be a hinge, ball joint, or other type of equivalent function joint. Swivel connection 206 allows rigid body 204 to swing side-to-side as illustrated by double-headed arrow, S, in FIG. 2A. Alternatively, rigid body 204 may comprise a frame (as depicted in and further explained in relation to FIG. 6) or some other structure able to swing and able to transfer moment from umbilical 2 to member 8. An actuator 208 may be actuated by a motor, 209, which is in turn controlled by a local controller 210 to ensure that swivel connection 206 comprises a stiff connection and adjusts swing position, S, of rigid body 204 based on one or more signals given from a vessel or other signal source (not illustrated) through strength-taking umbilical 2. As rigid body 204 swings, the orientation of a tow-point 210 changes. The tension from strength-taking umbilical 2 is transferred into a moment on member 8 that causes source array 200 to position itself with an angle of attack (α) with respect to incoming flow, F. This positioning, and change of position, causes source array 200 to position or re-position itself, typically laterally, although other movements are possible.

Figure 3:
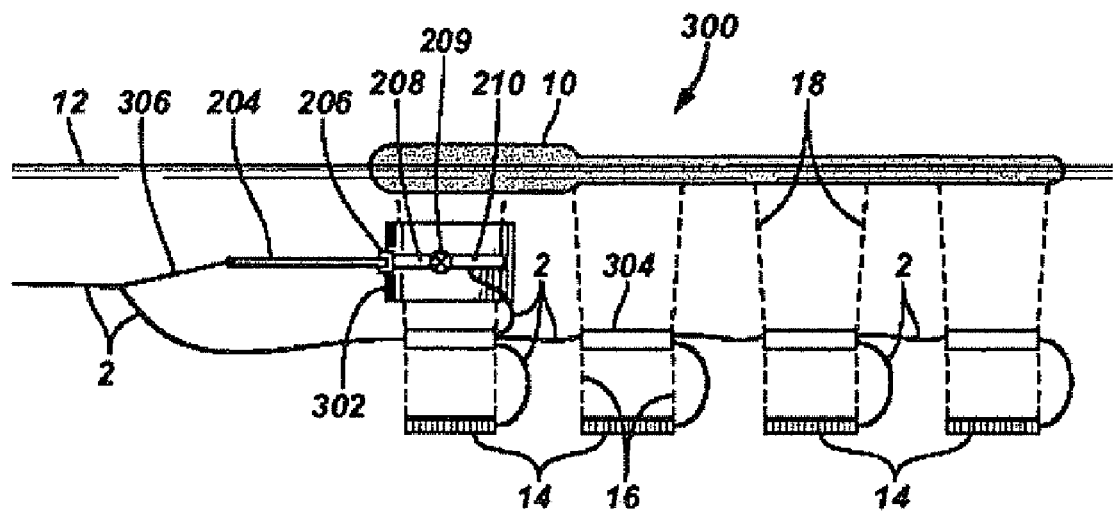
FIG. 3 illustrates a schematic side-elevation view of a second position controllable marine seismic apparatus and method of the invention.

FIG. 3 illustrates a schematic side-elevation view of a second position controllable marine seismic source array 300 and method of the invention. Comparing embodiment 300 with embodiment 200 of FIG. 2, note that member 8 in FIG. 2 is replaced with a plate or hydrofoil-shaped body 302 having a higher aspect ratio (ratio between height and length) that may result in better deflection performance. However, note that deflection of member 302 need not be identical to the deflection of the source array it is associated with, that is, the angle of attack of plate or hydrofoil 302 may be different than the angle of attack of the source array. This is true whenever a deflection member has a length different than the length of the source member. Plate or hydrofoil-shaped body 302 is illustrated as suspended between float 10 and a hang plate 304, however, body 302 could also be in front of or behind float 10 and source members 14. Swivel connection 206 is provided, as in embodiment 200 of FIG. 2, as are actuator 208, motor 209, local controller 210, and rigid body 204, which may be mounted onto plate or hydrofoil-shaped body 302 using any suitable means, such as bolts, screws, weldments, and the like. A towing harness 306 connects strength-taking umbilical 2 and rigid body 204.

Figure 4:
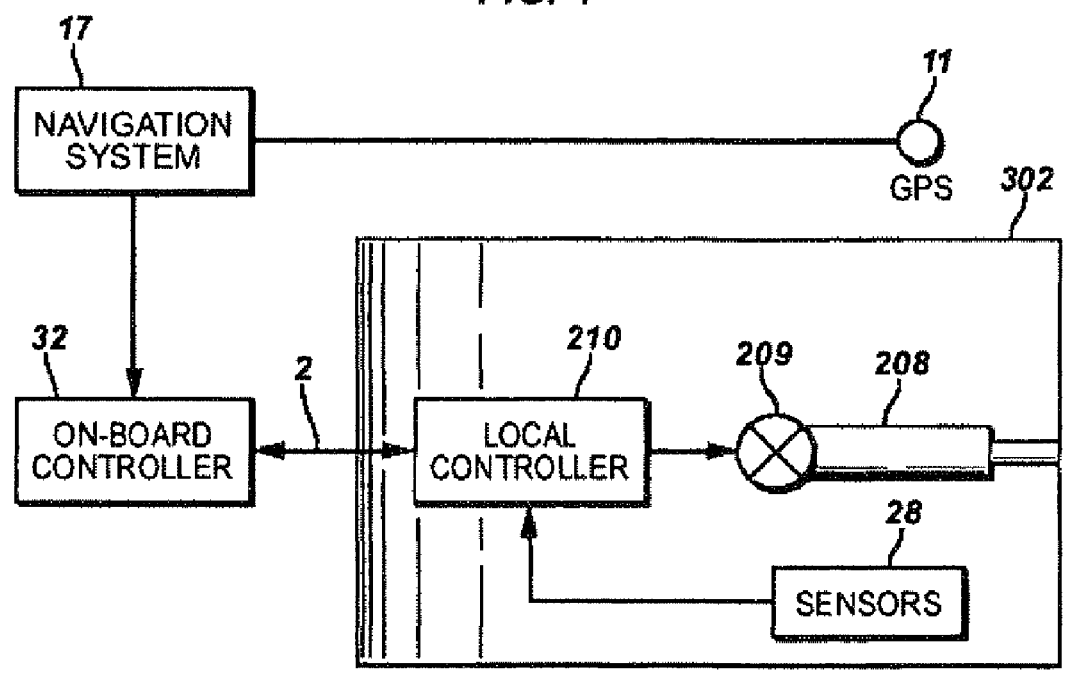
FIG. 4 is a schematic diagram of a process control scheme useful in the present invention for controlling position of seismic sources using the apparatus and systems of the invention.

FIG. 4 is a schematic diagram of a control scheme useful with all apparatus and methods of the present invention, for example those depicted in FIGS. 2, 3, 5, 6, 8, 10, and 11, and is not limited to any particular apparatus or method of the invention. A positioning unit 11, mounted for example on source array 200 (FIG. 2A) transmits position of source array 200 to a navigation system 17 located on the tow vessel (not illustrated). Navigation system 17 provides the location information received from positioning unit 11 to an on-board controller 32. On-board controller 32 may be a computer, a distributed control system, an analog control system or other control device known to those having ordinary skill in the art. On-board controller 32 may communicate with a local controller 210 through umbilical 2, but may alternatively communicate through a wireless transmission. Umbilical 2 contains conductors for providing power and control signals to and from plate or hydrofoil-shaped body 302. Local controller 210 sends a signal to an electric motor 31 that moves actuator 208, which in turn moves plate or hydrofoil-shaped body 302. When plate or hydrofoil-shaped body 302 moves, the lateral force imparted against it by the water steers source array 200 to the desired position. Sensors 28 may detect the angular position of plate or hydrofoil-shaped body 302 and send this information back to local controller 210 and, optionally, to on-board controller 32 where it may be displayed for an operator to read.

Figure 1A:
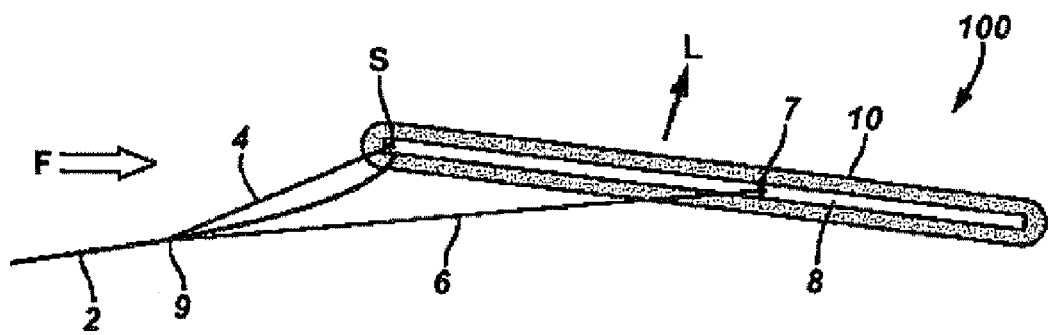
FIGS. 1A and 1B illustrate schematic plan and side-elevation views, respectively, of a prior art marine seismic steering apparatus and method.
Figure 1B:
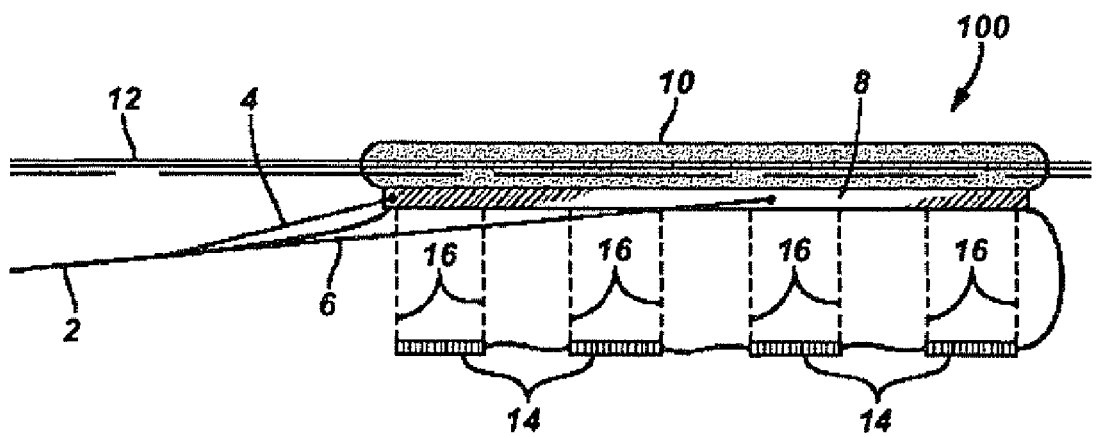
Figure 5A:
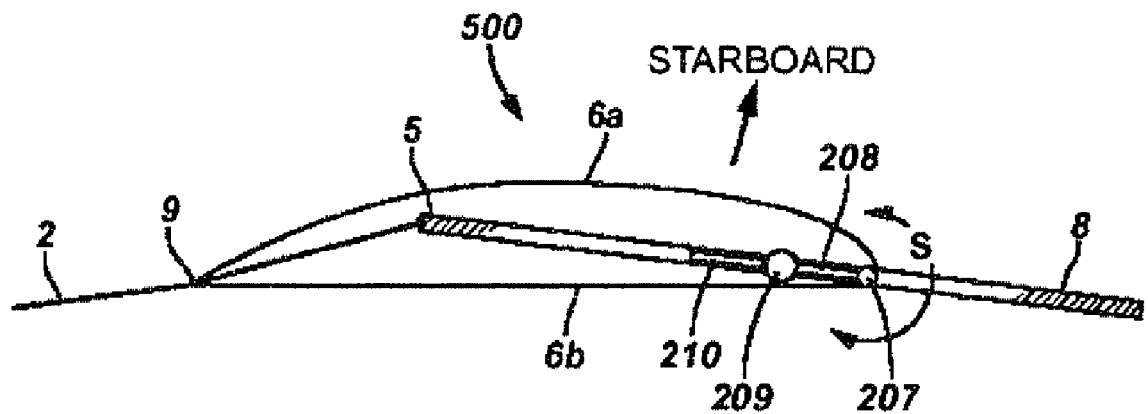
FIGS. 5A-C illustrate schematic plan views of position controllable marine seismic apparatus and methods of the invention employing bridle systems as part of the adjustment mechanism.
Figure 5B:
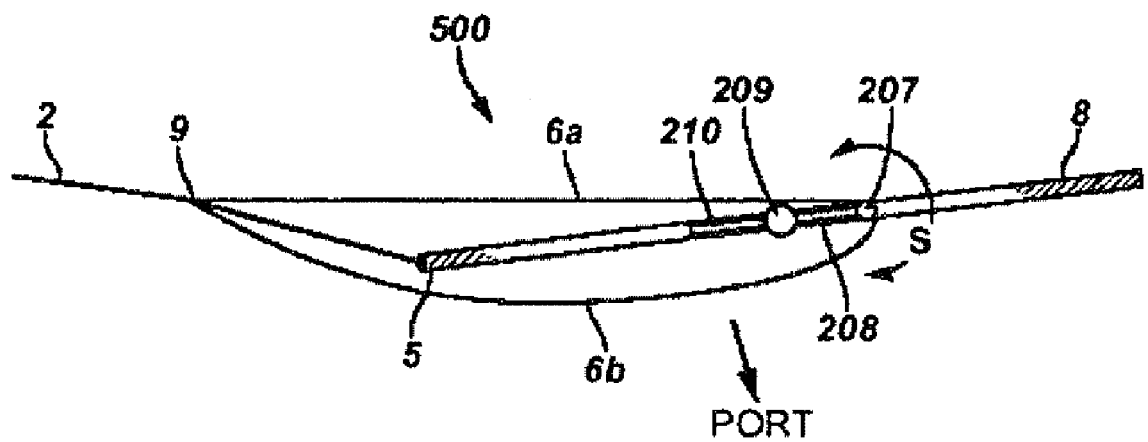
Figure 5C:
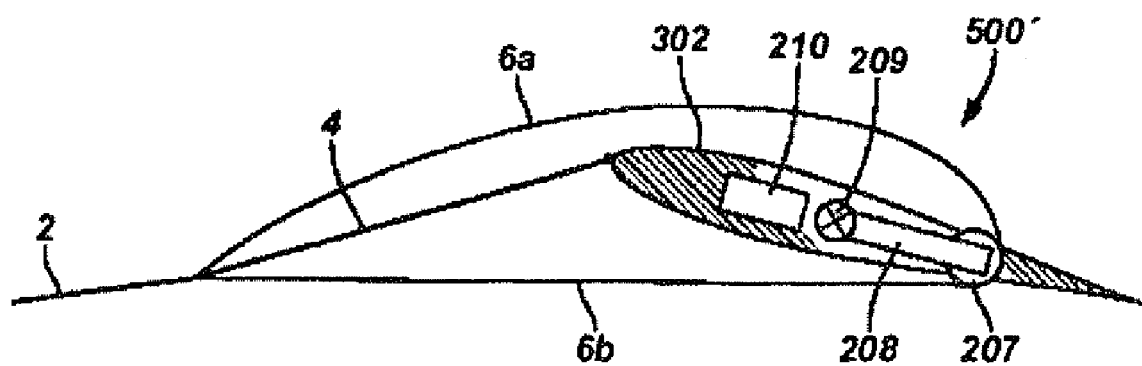

FIGS. 5A and 5B illustrate schematic plan views of a third position controllable marine seismic apparatus 500 and method of the invention. Apparatus 500 builds on prior art apparatus 100 depicted schematically in FIG. 1, modified to make the bridle system remotely adjustable. A source array, illustrated by member 8 only, is towed behind a seismic vessel (not illustrated) by strength-taking umbilical 2. A bridle system comprised of a front bridle leg 4 and aft bridle legs 6a and 6b is used in order to achieve the desired angle of attack of member 8. Bridle legs 4, 6a, and 6b may be the same or different in composition and may be wires, cables, ropes, or any other material that can function as described. Each of bridle legs 4, 6a, and 6b are connected to strength-taking umbilical 2 at a point 9. Front bridle leg 4 connects to member 8 at a front point 5 and is substantially always taught. Aft bridle legs 6a and 6b are routed through member 8 in a loop as illustrated in FIGS. 5A and 5B. Position control (starboard or port, as illustrated by the labeled arrows) is achieved by maintaining one of bridle legs 6a and 6b taught (6a is taught in port position, 6b is taught in starboard) while its complement bridle leg is slack. Positioned on member 8 approximately at its mid-section (could be anywhere along member 8) is a rotatable member 207, for example a motor- or winch-driven pulley or equivalent functioning means, that acts on bridle legs 6a and 6b so as to rotate member 8 as illustrated by double-headed arrow S in order to achieve the desired angle of attack. A local controller 210 that communicates with an on-board controller 32 (FIG. 4) on the seismic vessel through umbilical 2 controls a motor 209, which in turn moves actuator 208, and rotatable member 207. Alternatively, rather than a motor- or winch-driven rotatable actuator, one may simply employ a linear actuator, for example an electric, hydraulic or pneumatic jack connected to a point between bridle legs 6a and 6b to maintain one leg taught. Another alternative to using a rotatable actuator would be to use a pair linear actuators, for example a pair of hydraulic or pneumatic piston/cylinder actuators, one each directly on bridle legs 6a and 6b, similar to the arrangement illustrated in and discussed below in relation to FIG. 6C, which illustrates a high aspect ratio plate or hydrofoil. The arrangement of embodiment 500 of FIG. 5A may be employed as well with a high aspect ratio plate or hydrofoil as depicted schematically in FIG. 5C. This figure illustrates embodiment 500', including a high aspect ration plate or hydrofoil 302 moved to starboard deflecting position. All other elements in embodiment 500' of FIG. 5C are equivalent to those of embodiment 500 depicted in FIG. 5A except that bridle legs 6a and 6b may be shorter in embodiment 500' than in embodiment 500. The same alternative arrangements may be employed in embodiment 500' as were discussed in relation to embodiment 500 of FIGS. 5A and 5B, including replacing the rotatable actuator with a linear actuator, employing a frame, and employing a pair of linear actuators.

Figure 6A:
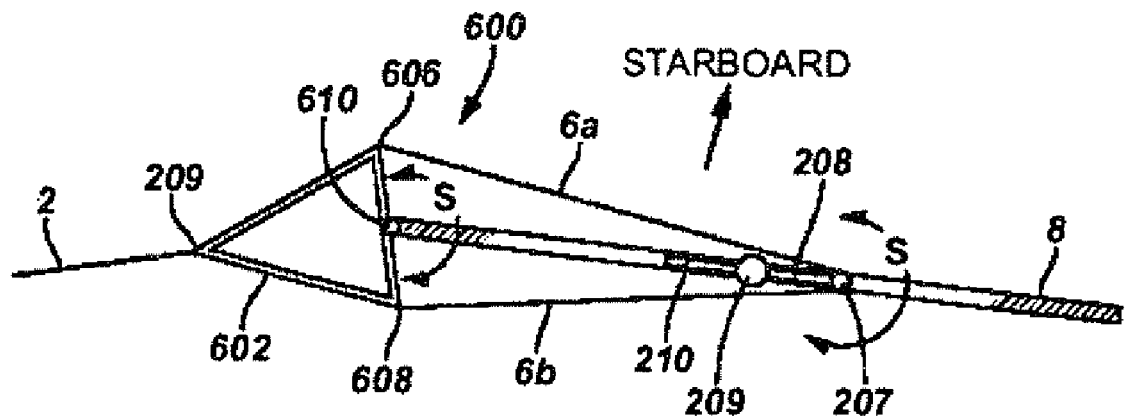
FIGS. 6A-C illustrate schematic plan views of position controllable marine seismic apparatus and methods of the invention employing frames as part of the adjustment mechanism.
Figure 6B:
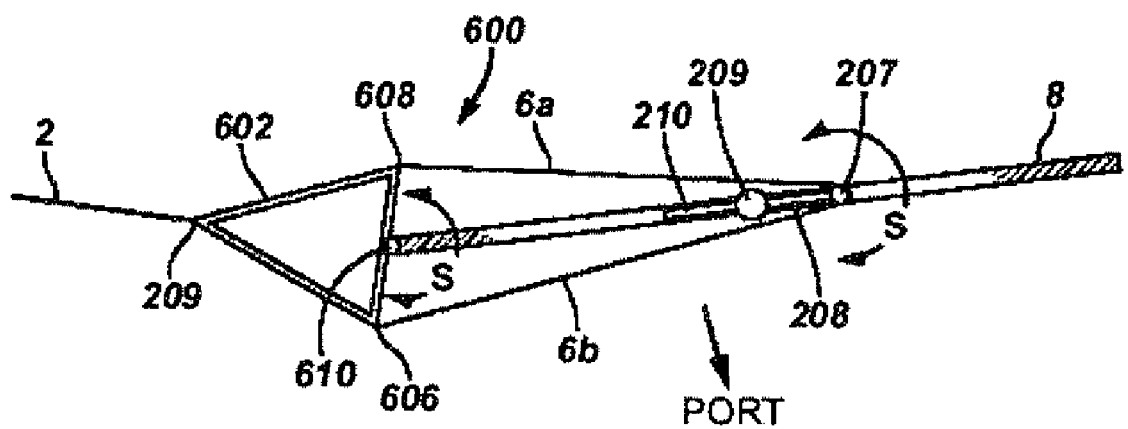
Figure 6C:
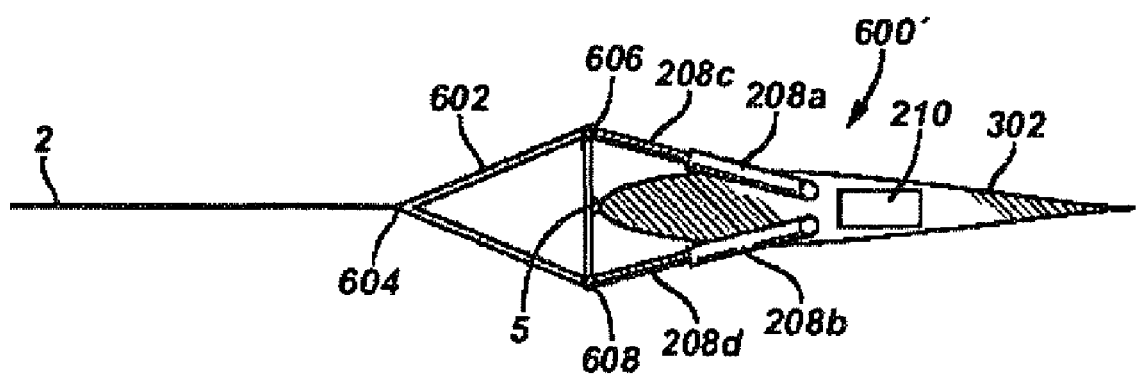

FIGS. 6A and 6B illustrate schematic plan views of a fourth position controllable marine seismic apparatus 600 and method of the invention. An adjustable bridle system comprising bridle legs 6a and 6b, rotating member 207, actuator 208, motor 209, and local controller 210 are illustrated, with both bridle legs 6a and 6b remaining substantially taught. Bridle legs 6a and 6b are connected to a stiff frame 602 at points 608 and 606, respectively, and to strength-taking umbilical 2 at point 604, so that frame 602 may pivot about a swivel joint 610, which may be a hinge, ball joint, or other equivalent function joint, positioned at front end of member 8. An alternative (not shown) is to replace the combination of rotating member 207, actuator 208, and motor 209 with a linear actuator as discussed above in relation to FIGS. 5A and 5B. Another alternative is to replace bridle legs 6a and 6b with linear actuators, but closer to the frame 602, as illustrated in schematic plan view in embodiment 600' of FIG. 6C. Embodiment 600' includes a pair of piston/cylinder actuators 208a and 208b. Cylinder 208a is attached to plate or hydrofoil 302, while its corresponding piston 208c is attached to frame 602 at point 606. Similarly, cylinder 208b is attached to plate or hydrofoil 302 and piston 208d is attached to frame 602 at point 608.

Figure 7:
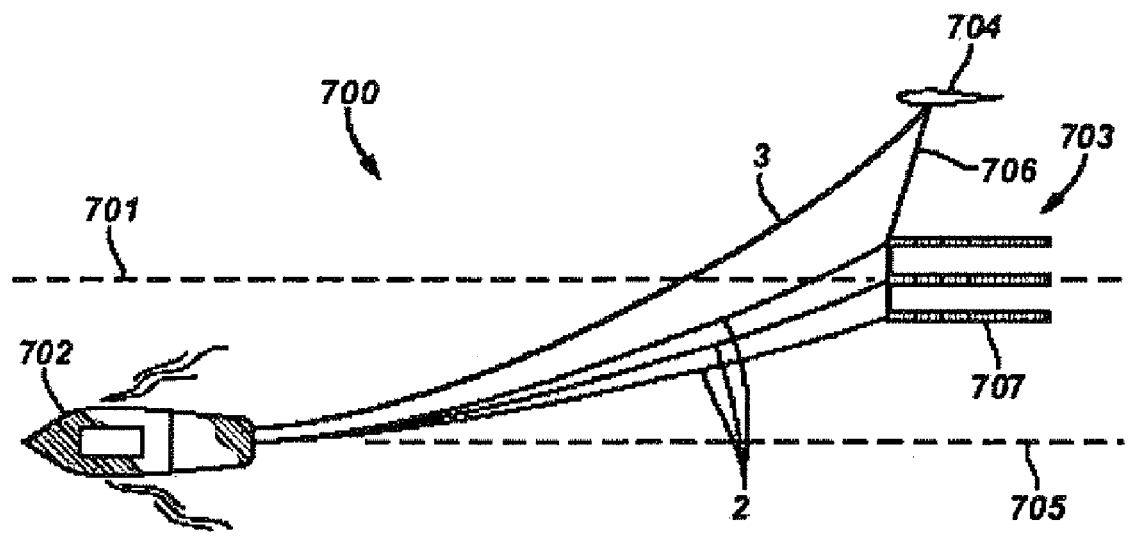
FIG. 7 illustrates a schematic aerial plan view of a system of the invention.

Referring now to FIG. 7 there is illustrated a schematic plan view of a marine seismic system 700 and method of the invention. Illustrated schematically is a tow vessel 702 following a desired path, which may be straight or curved, and one seismic source 703 of a dual seismic source (the other source not shown) showing a line of symmetry 705 between the two sources. Source 703 comprises three passive, non-steerable source arrays 707, each source array 707 connected to tow vessel 702 through its own strength-taking umbilical 2, and a deflector 704 that is connected to seismic source 703 through an umbilical 706. Alternatively umbilical 706 may be a passive, strength-taking member such as a rope, wire, or equivalent passive connector, while deflector 704 is towed by use of a separate strength-taking umbilical 3. Many arrangements are possible, and are discussed separately and in detail in reference to FIGS. 11A-F. By adjusting its angle of attack, deflector 704 changes its lateral position, and this change in position deflects seismic source 703 away from or back to a path 701 (shown as straight but could be curved), as desired by the seismic survey team. In case of a dual source system, there would be one source/deflector system as shown in FIG. 7 on each side of the symmetry line 705. In case of a single source system (see FIGS. 11A-F) the source is positioned with its center at the symmetry line 705 and with one deflector on each side enabling positioning to either side of the symmetry line.

Deflectors useful in the invention may be any type of deflector able to adjust its angle of attack, including so-called free-flying deflectors, and non-free-flying deflectors that have streamers or other trailing, drag-producing means. As used herein the term "free-flying" means a deflector that is towed but does not have suspended to its tail end a streamer or other drag-producing device. In some situations it might be desired to include a stabilizing tow member to an otherwise free-flying deflector.

Figure 8:
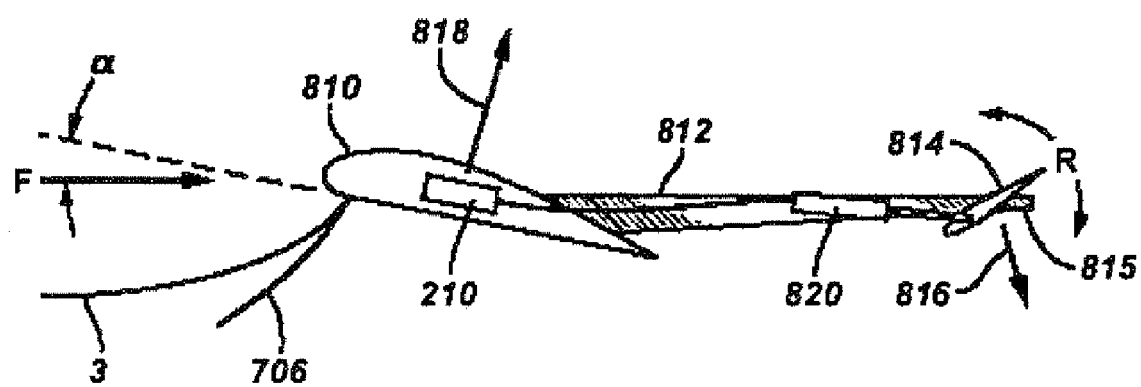
FIG. 8 illustrates a prior art wing-type deflector useful in the invention.

FIG. 8 illustrates a schematic cross-section view of a prior art free flying deflector 800 useful in the invention known under the trade designation "MONOWING", available from WesternGeco L.L.C., Houston, Tex. This particular embodiment of the deflector includes a main hydrofoil 810, a boom 812 rigidly fixed to main hydrofoil 810, and a so-called boom-wing 814 mounted near a rear end 815 of boom 812. By rotating boom-wing 814 as depicted by double-headed arrow R, it creates lift force in either positive or negative direction. As illustrated in FIG. 8 a negative lift force 816 is achieved. However, this lift translates into a moment that translates into a change of the orientation of main hydrofoil 810. The orientation, or angle of attack $\alpha$, of main hydrofoil 810 is important, as the lift force 818 of main hydrofoil 810 is directly proportional to $\alpha$, and proportional to the square of the magnitude of the inflow velocity (indicated by arrow F). An actuator 820 that communicates with a local controller 210 may adjust the orientation of boom-wing 814. Communication with tow vessel 702 (FIG. 7) is available through any of the combinations of strength-taking umbilicals and non-strength-taking umbilicals discussed herein (see discussion of FIGS. 11A-F). Local controller 210 may also communicate with on-board controller 32 (FIG. 4) and/or other remote controller(s) via wireless transmission. Deflectors useful in the invention may be suspended from or attached rigidly to a float on the sea surface.

Figure 9:
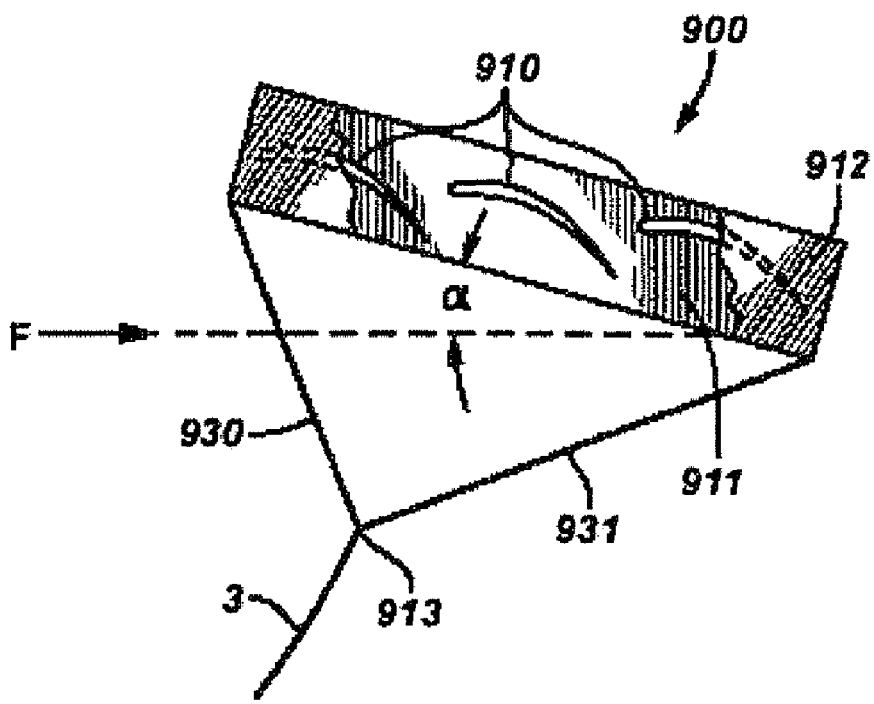
FIG. 9 illustrates a schematic plan view, with portions cut away, of a prior art door-type deflector.

FIG. 9 illustrates a schematic plan view, with portions cut away, of a prior art, so-called "door" deflector 900. This deflector is often used to deflect a marine seismic source to a nominal position. Three passive hydrofoils 910 (only the top ends of which are viewable in this view) are suspended between a pair of plates, a top plate 912 and a bottom plate 911, the latter of which is viewable through the portions of top plate 912 that are cut away. In three dimensions this comprises an array of hydrofoils with end plates 912 and 911 at the top and bottom of each hydrofoil 910. A towing bridle or harness comprising four legs is required: a front leg 930 and an aft leg 931 are illustrated attached to top plate 912. Two additional bridle legs 930' and 931', one forward and one aft, attach to bottom plate 911 but are not shown in this view. All four bridle legs come together in one point 913. Attached to bridle legs 930/931/930'/931' is a passive, strength-taking tow member 3, from which door 900 is towed by a tow vessel. The angle of attack $\alpha$ of door 900 is referenced to the inflow water velocity vector, F, approaching door 900 and the relative lengths between the front and aft bridle legs determine the angle $\alpha$. As position of door 900 is a function of the angle of attack, $\alpha$, the position of the door is not remotely adjustable.

Figure 10:
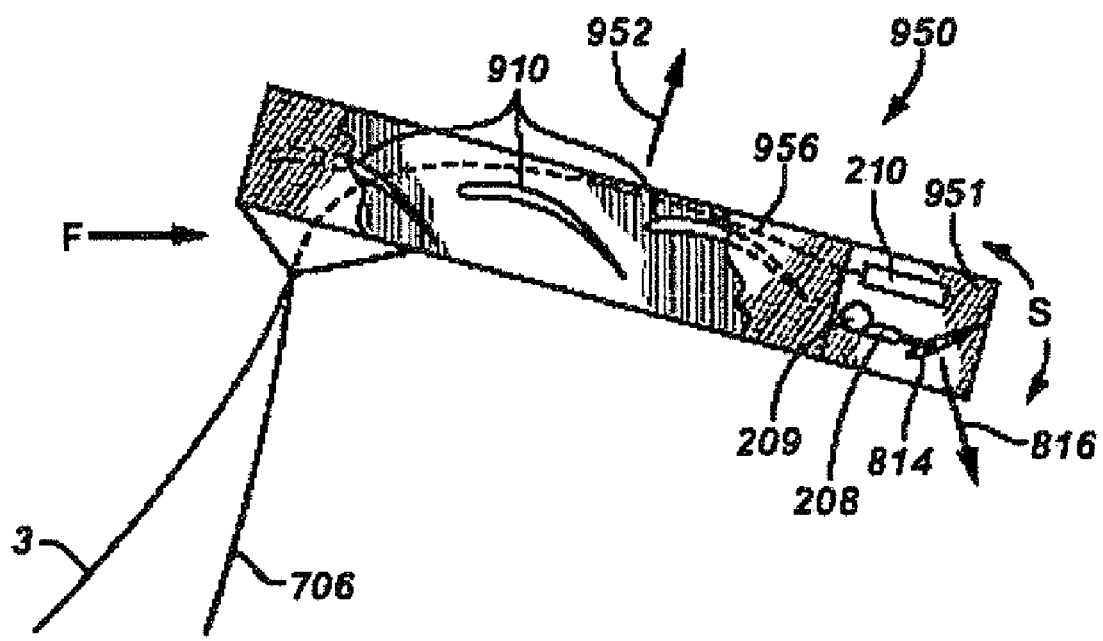
FIG. 10 illustrates a schematic plan view, with portions cut away, of the door-type deflector of FIG. 9 modified in accordance with the invention.

FIG. 10 illustrates a schematic plan view, with portion cut away, of a door-type deflector 950 of the invention, which is similar to deflector 900 of FIG. 9, but modified in accordance with the invention to make its angle of attack remotely controllable. Aft bridle legs are not required and a unit 951 is included that includes a hydrofoil 814 with similar function as boom-wing 814 of FIG. 8. The function of hydrofoil 814 is not to produce lift as the hydrofoils 910 (FIG. 9), but to create a smaller lift force 816 that causes modified door 950 to orient itself with the desired angle of attack $\alpha$ relative to incoming water flow velocity vector, F. As the total lift 952 is a function of angle of attack $\alpha$, total lift 952 may be adjusted by adjusting the orientation and hence the lift of hydrofoil 814. The angle of attack (orientation) of hydrofoil 814 may be adjusted by an actuator 208 that is operatively coupled to a motor 209 and local controller 210. Local controller 210 may communicate with on-board controller 32 (FIG. 4) on the tow vessel through strength-taking umbilical 3, or through umbilical 706 and strength-taking tow-member 2 (not illustrated). Local controller 210 may also communicate with on-board controller 32 and/or other remote controller(s) via wireless transmission.

FIGS. 11A-F illustrate six non-limiting embodiments of how one may arrange active, strength-taking tow members, passive strength-taking tow members, and umbilicals (recall as defined herein an umbilical is non-strength-taking unless indicated otherwise). In each of FIGS. 11A-F, tow vessel 702 and seismic source 703 are indicated as being connected by a strength-taking umbilical 2. It will be understood that the functions of strength-taking umbilical 2 could be divided into a passive, strength-taking tow member and an umbilical in each of FIGS. 11A-F.

Figure 11A:
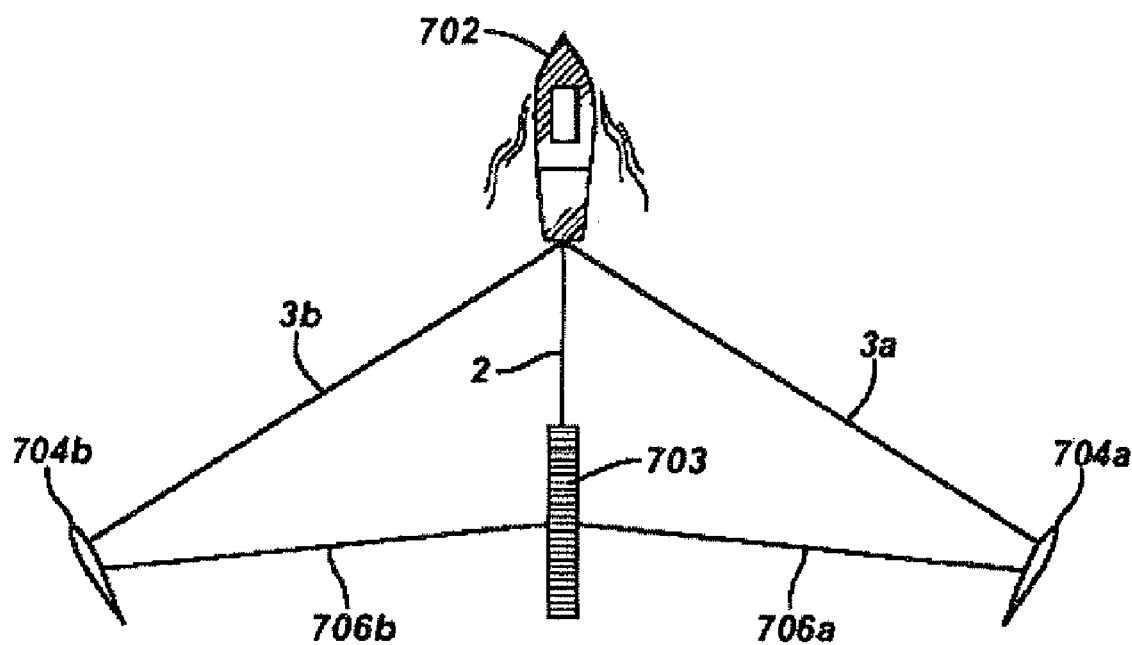
FIGS. 11A-F are simplified schematic diagrams illustrating six non-limiting alternative tow member arrangements.

FIG. 11A illustrates an embodiment wherein a tow vessel 702 tows a single seismic source 703 and deflectors 704a and 704b. Tow vessel 702 and each deflector 704a and 704b are connected using respective passive, strength-taking tow members 3a and 3b. Source 703 is connected with deflectors 704a and 704b using respective active, strength-taking tow members 706a and 706b.

Figure 11B:
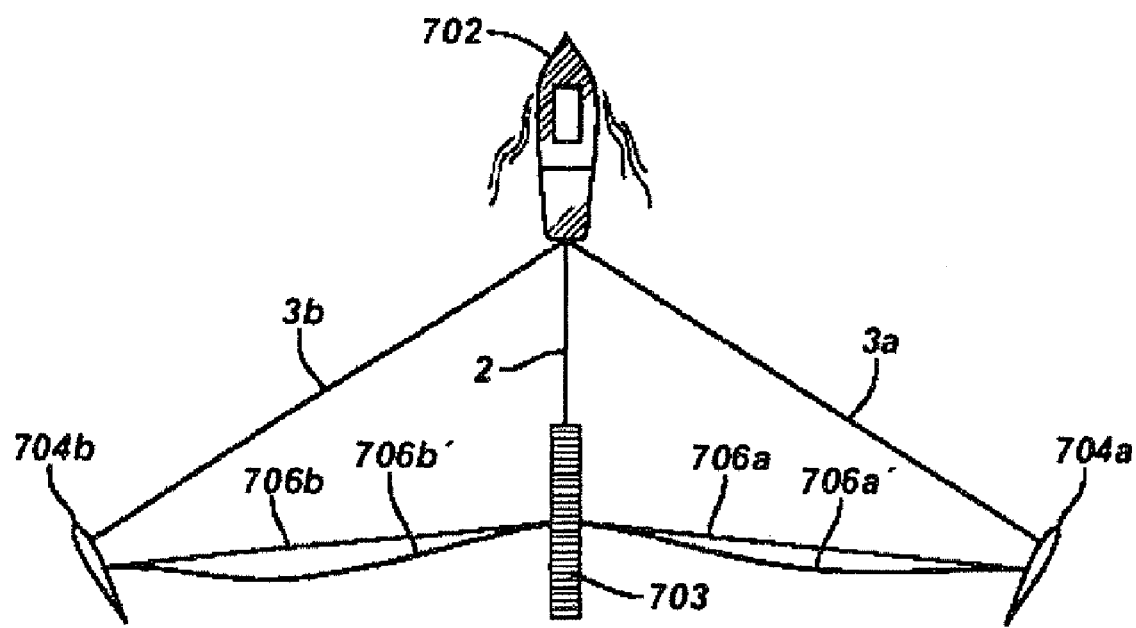

FIG. 11B illustrates an embodiment identical to that of FIG. 11A except that active, strength-taking tow members 706a and 706b are replaced by a combination of a passive, strength-taking tow members 706a and 706b and umbilicals 706a' and 706b'.

Figure 11C:
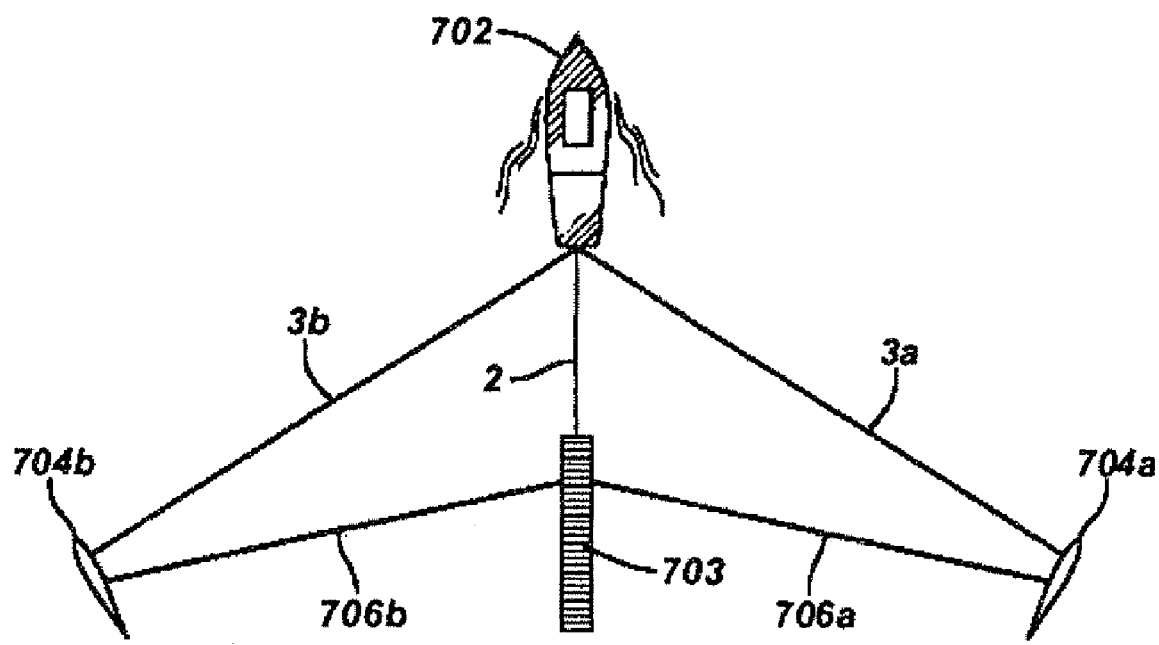

FIG. 11C illustrates an embodiment that might be viewed as the reverse of that of FIG. 11A. Tow members 3a and 3b are now active, strength-taking tow members, while tow members 706a and 706b are passive, strength-taking tow members.

Figure 11D:
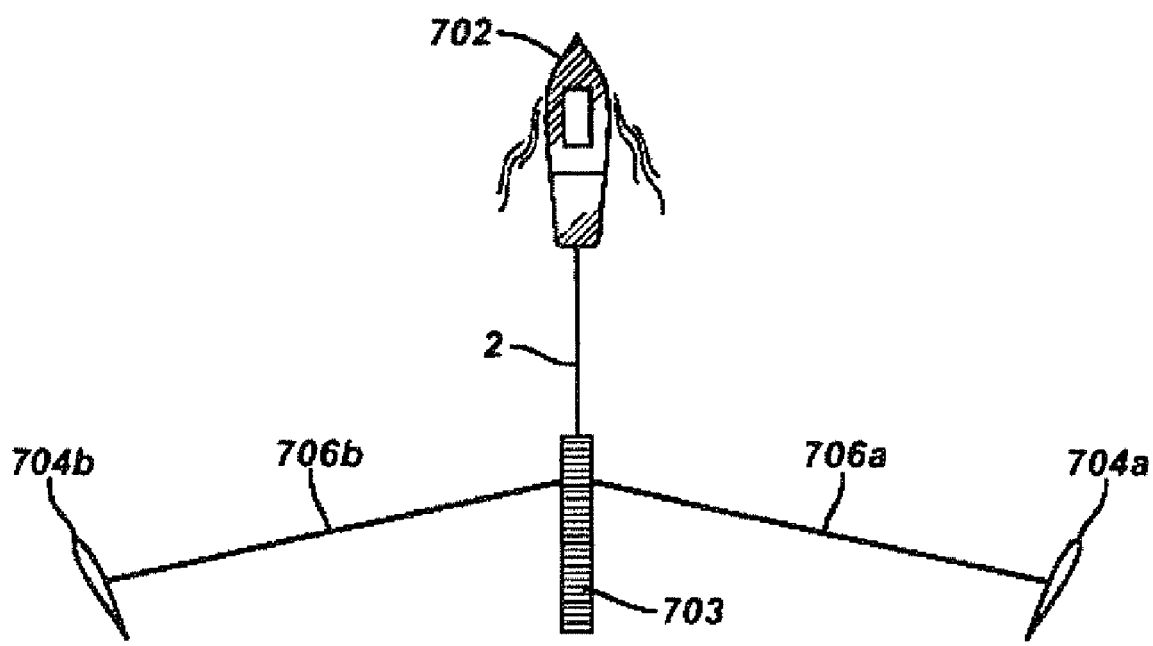

FIG. 11D illustrates an embodiment where there is no direct mechanical connection between tow vessel 702 and deflectors 704a and 704b. In this embodiment active, strength-taking tow members 706a and 706b connect source 703 with deflectors 704a and 704b, respectively. The deflectors in this case are remote controlled either through communications links in 706a, 706b, and 2' or through wireless transmission.

Figure 11E:
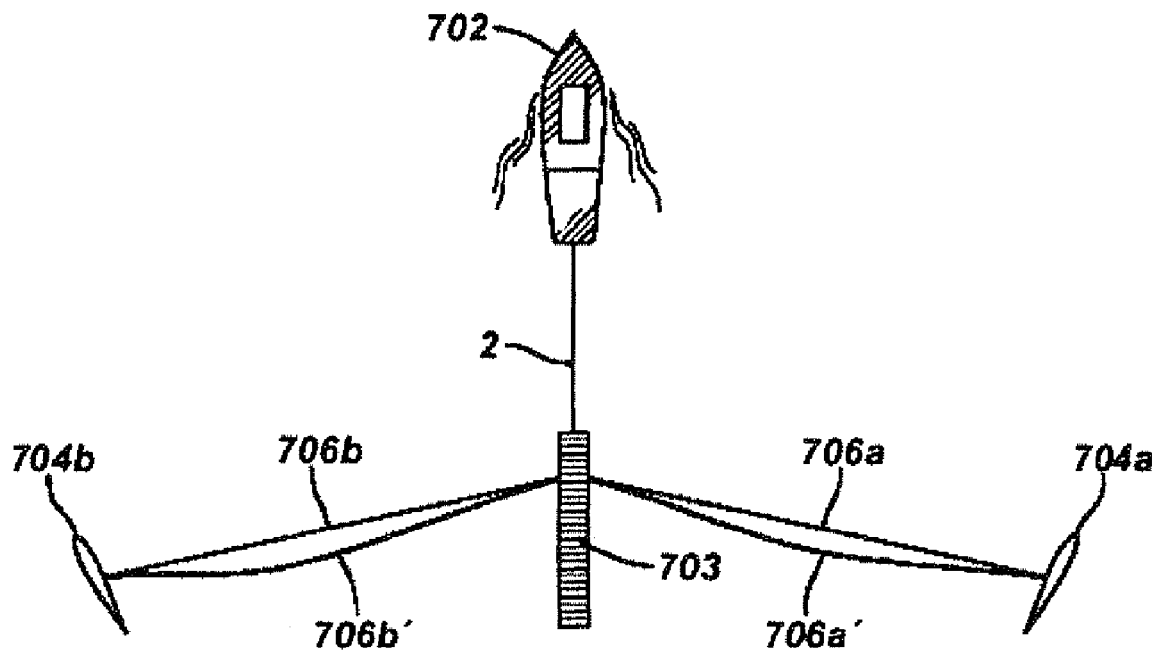

FIG. 11E illustrates another embodiment where there is no direct mechanical connection between deflectors and tow vessel. Passive, strength-taking tow members 706a and 706b connect between deflectors 704a and source 703, and deflector 704b and source 703, respectively. Umbilicals 706a' and 706b' provide power and optionally communication and data transmission links, and may include other utilities such as compressed air, and the like.

Figure 11F:
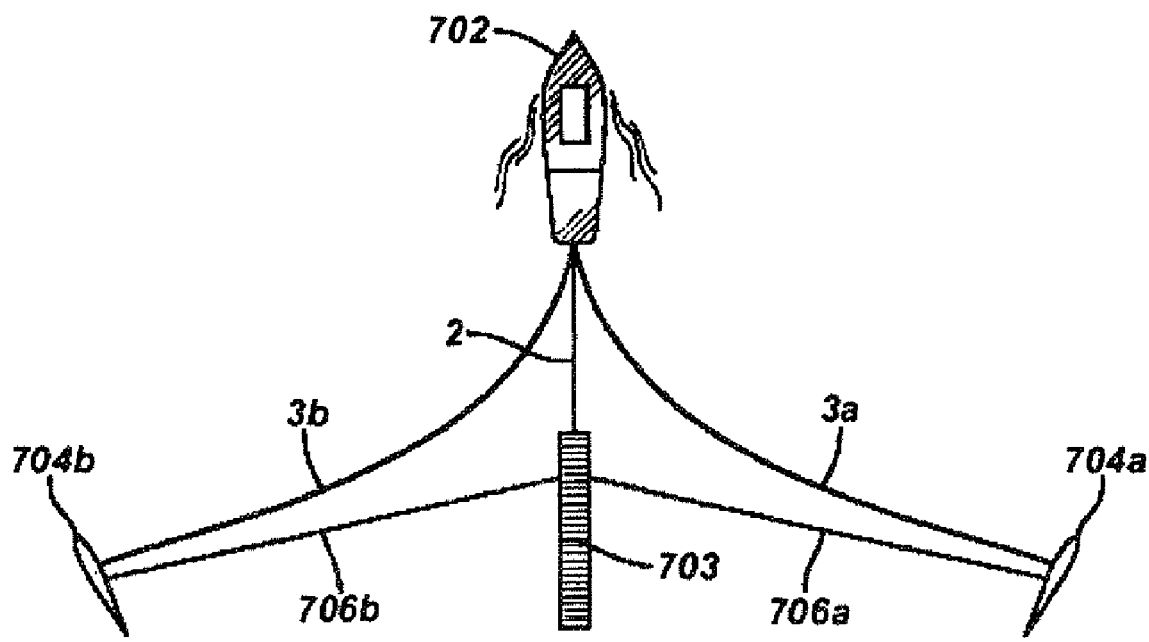

FIG. 11F illustrates an embodiment where source 703 tows deflectors 704a and 704b through passive, strength-taking tow members 706a and 706b, respectively. Umbilicals 3a and 3b function as power and, optionally, communications links between deflectors 704a, 704b, respectively and tow vessel 702.

In use the position of a deflecting member on a source, or deflector associated with a source via umbilicals and/or passive tow cables, is actively controlled by GPS or other position detector sensing the position of the source or deflector and feeding this data to a navigation system. Navigation may be performed on board a tow vessel, on some other vessel, or indeed a remote location. By using a communication system, either hardwire or wireless, information from the remote controller is sent to one or more local controllers on deflectors and/or deflecting members of sources. The local controllers in turn are operatively connected to adjustment mechanisms comprising motors or other motive power means, and actuators on the deflectors and/or deflecting members, which function to move a wing, plate or hydrofoil, or a bridle system, depending on the adjustment mechanism used. This in turn adjusts the angle of attack of the deflector or deflecting member, causing it to move the source as desired. Feedback control may be achieved using local sensors on the deflectors or deflecting members, which may inform the local and remote controllers of the position of a swivel connector, a wing or hydrofoil, the angle of attack of a deflector or wing or hydrofoil of a particular boom wing, a position of an actuator, the status of a motor or hydraulic cylinder, the status of a bridle system, and the like. A computer or human operator can thus access information and control the entire positioning effort, and thus obtain much better control over the seismic data acquisition process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An apparatus comprising:
    a float;
    a source tow member supported by the float at a position beneath the float and spaced from the float;
    a seismic source array connected to the source tow member; and
    an adjustment mechanism by which the apparatus may be towed defining a swivel with the source tow member and capable of actively manipulating an angle of attack of the source array, wherein the adjustment mechanism comprises:
        a deflecting member connected to the source tow member to rotate relative to the source tow member in a lateral plane;
        an actuating mechanism capable of rotating the deflecting member; and
        a controller to selectively rotate the deflecting member relative to the heading of the source tow member through control of the actuating mechanism.

2. The apparatus of claim 1, wherein the source tow member comprises a laterally rigid member.

3. The apparatus of claim 1, wherein the source tow member comprises a plate.

4. The apparatus of claim 1, wherein the source tow member comprises a hydrofoil.

5. The apparatus of claim 1, wherein the source tow member is suspended by chains below the float.

6. The apparatus of claim 1, wherein the source tow member is rigidly affixed to the float.

7. The apparatus of claim 1, wherein the source tow member is disposed behind the float.

8. The apparatus of claim 1, wherein the source array comprises a plurality of source members, at least one of the source members being suspended from the source tow member.

9. A marine seismic source, comprising:
    a float;
    a laterally rigid member supported by the float;
    a seismic source array including a plurality of source members suspended from the laterally rigid member; and
    an adjustment mechanism by which the marine seismic source may be towed, the adjustment mechanism being capable of actively manipulating an angle of attack of the source array and comprising:
        a swivel connected with the laterally rigid member;
        a deflecting member connected to the laterally rigid member by the swivel to rotate relative to the laterally rigid member in a lateral plane;
        an actuating mechanism capable rotating the deflecting member; and
        a local controller capable of rotating the deflecting member relative to the heading of the laterally rigid member through control of the actuating mechanism.

10. The marine seismic source of claim 9, wherein the adjustment mechanism includes a towing harness.

11. The marine seismic source of claim 9, wherein the adjustment mechanism comprises a deflecting member, a bridle system, and an actuator mounted on the deflecting member and operatively connected with the bridle system.

12. The marine seismic source of claim 9, wherein the adjustment mechanism comprises a deflecting member, a frame, and an actuator mounted on a deflecting member and operatively connected with the frame.

13. The marine seismic source of claim 9, wherein the laterally rigid member is suspended below the float.

14. The marine seismic source of claim 9, wherein the laterally rigid member is rigidly affixed to the float.

15. A marine seismic source, comprising:
a float;
a lifting body suspended at a distance beneath the float;
a seismic source array including a plurality of source members suspended from at least one of the lifting body and the float; and
an adjustment mechanism by which the marine seismic source may be towed, the adjustment mechanism:
  defining a swivel with the lifting body by which the adjustment mechanism rotates relative the lifting body in a lateral plane; and
  being capable of actively manipulating an angle of attack of the source array, wherein the adjustment mechanism comprises:
  a deflecting member connected to the lifting body to rotate relative to the lifting body in a lateral plane;
  an actuating mechanism capable of rotating the deflecting member; and
  a local controller capable of rotating the deflecting member relative to the heading of the lifting body through control of the actuating mechanism.

16. The marine seismic source of claim 15, wherein the lifting body comprises a plate.

17. The marine seismic source of claim 15, wherein the lifting body comprises a hydrofoil.

18. The marine seismic source of claim 15, wherein the adjustment mechanism includes a towing harness.

19. The marine seismic source of claim 15, wherein the adjustment mechanism comprises a deflecting member, a bridle system, and an actuator mounted on the deflecting member and operatively connected with the bridle system.

20. The marine seismic source of claim 15, wherein the adjustment mechanism comprises a deflecting member, a frame, and an actuator mounted on the deflecting member and operatively connected with the frame.

* * * * *